(12) United States Patent
Gupta et al.

(10) Patent No.: US 9,207,983 B2
(45) Date of Patent: *Dec. 8, 2015

(54) METHODS FOR ADAPTING APPLICATION SERVICES BASED ON CURRENT SERVER USAGE AND DEVICES THEREOF

(75) Inventors: Puneet Gupta, Bangalore (IN); Akshay Darbari, Allahabad (IN); Venkat Kumar Sivaramamurthy, Bangalore (IN)

(73) Assignee: Infosys Limited, Bangalore (IN)

( * ) Notice: Subject to any disclaimer, the term of this patent is extended or adjusted under 35 U.S.C. 154(b) by 75 days.
This patent is subject to a terminal disclaimer.

(21) Appl. No.: 13/422,957

(22) Filed: Mar. 16, 2012

(65) Prior Publication Data
US 2013/0117438 A1    May 9, 2013

(30) Foreign Application Priority Data

Nov. 9, 2011    (IN) .......................... 3843/CHE/2011

(51) Int. Cl.
*G06F 15/173*    (2006.01)
*G06F 9/50*    (2006.01)

(52) U.S. Cl.
CPC ........ *G06F 9/5011* (2013.01); *G06F 2209/504* (2013.01); *Y02B 60/142* (2013.01)

(58) Field of Classification Search
None
See application file for complete search history.

(56) References Cited

U.S. PATENT DOCUMENTS

| | | | |
|---|---|---|---|
| 7,237,034 B2 | 6/2007 | Clarke et al. | |
| 7,877,479 B2 | 1/2011 | Ikada et al. | |
| 8,549,582 B1* | 10/2013 | Andrews et al. | 726/3 |
| 8,918,866 B2* | 12/2014 | Luo | H04L 63/20 713/187 |
| 2002/0035642 A1* | 3/2002 | Clarke et al. | 709/244 |
| 2007/0070890 A1* | 3/2007 | Rojahn | 370/229 |
| 2008/0225710 A1* | 9/2008 | Raja et al. | 370/230.1 |
| 2008/0281958 A1* | 11/2008 | McKinnon | G06F 9/5027 709/224 |
| 2008/0304411 A1* | 12/2008 | Ikada et al. | 370/232 |
| 2009/0106571 A1* | 4/2009 | Low et al. | 713/310 |
| 2010/0128605 A1* | 5/2010 | Chavan et al. | 370/230.1 |
| 2010/0322237 A1* | 12/2010 | Raja | H04L 63/1433 370/389 |
| 2010/0325191 A1* | 12/2010 | Jung et al. | 709/202 |
| 2013/0111467 A1* | 5/2013 | Sundararaj | G06F 9/505 717/176 |
| 2013/0305245 A1* | 11/2013 | Doddavula | G06F 9/50 718/1 |

FOREIGN PATENT DOCUMENTS

WO    2011071850 A2    6/2011

OTHER PUBLICATIONS

Abdelzaher et al., "Web Content Adaptation to Improve Server Overload Behavior", Computer Networks: The International Journal of Computer and telecommunications Networking, vol. 31, Issue 11-16, pp. 1-16 (1999).
Lee et al., "A Proportional-Delay DiffServ-Enabled Web Server: Admission Control and Dynamic Adaptation", IEEE Transactions on Parallel and Distributed Systems, vol. 15, No. 5, pp. 1-16 (2004).
Internet Content Adaptation Protocol (ICAP) Network Appliance, Version 1.01, obtained from http://www.icap-forum.org/documents/specification/icap_whitepaper_v1-01.pdf, last retrieved on Mar. 2, 2012.
Shaha et al., "Multimedia Content Adaptation for QoS Management Over Heterogeneous Networks", Proceedings of the International Conference on Internet Computing, pp. 1-7 (2001).

* cited by examiner

*Primary Examiner* — Jason K. Gee
*Assistant Examiner* — Olanrewaju Bucknor
(74) *Attorney, Agent, or Firm* — LeClairRyan, a Professional Corporation

(57) ABSTRACT

A method, non-transitory computer readable medium, and apparatus that monitor one or more capacity related factors of one or more servers providing one or more services to one or more client computing devices to obtain one or more values. An adaption factor for at least one of the one or more client computing devices is determined based on the one or more obtained values for the one or more monitored capacity related factors and one or more adaption rules. The adaption factor may further be determined based on obtained user profile information. The determined adaption factor to adapt operation of the one or more provided services at the at least one of the one or more client computing devices is provided.

21 Claims, 3 Drawing Sheets

METHODS FOR ADAPTING APPLICATION SERVICES BASED ON CURRENT SERVER USAGE AND DEVICES THEREOF

FIELD

This application claims the benefit of Indian Patent Application Filing No. 3843/CHE/2011, filed Nov. 9, 2011, which is hereby incorporated by reference in its entirety.

This technology relates to methods for dynamically adapting application services on a client computing device to current server usage and obtained user profile information and devices thereof.

BACKGROUND

The rate at which computing devices, such as laptop computing systems, desktop computing systems, tablets, smart phones, and PDAs, download and execute applications continues to grow at a rapid rate. Unfortunately, currently these computing devices have no effective mechanism for adapting to the impact execution of applications have on the current load of responsive servers. When server overload occurs, current technology simply denies access to one or more of the computing devices to the servers.

SUMMARY

A method for determining an adaption factor includes monitoring with an adaption management computing device one or more capacity related factors of one or more servers providing one or more services to one or more client computing devices to obtain one or more values. An adaption factor for at least one of the one or more client computing devices is determined with the adaption management computing device based on the one or more obtained values for the one or more monitored capacity related factors and one or more adaption rules. The adaption factor may further be determined with the adaption management computing device based on obtained user profile information. The determined adaption factor to adapt operation of the one or more provided services at the at least one of the one or more client computing devices is provided with the adaption management computing device.

A non-transitory computer readable medium having stored thereon instructions for determining an adaption factor comprising machine executable code which when executed by at least one processor, causes the processor to perform steps including monitoring one or more capacity related factors of one or more servers providing one or more services to one or more client computing devices to obtain one or more values. An adaption factor for at least one of the one or more client computing devices is determined based on the one or more obtained values for the one or more monitored capacity related factors and one or more adaption rules. The adaption factor may further be determined based on obtained user profile information. The determined adaption factor to adapt operation of the one or more provided services at the at least one of the one or more client computing devices is provided.

An adaptation management computing device includes a memory coupled to one or more processors which are configured to execute programmed instructions stored in the memory including monitoring one or more capacity related factors of one or more servers providing one or more services to one or more client computing devices to obtain one or more values. An adaption factor for at least one of the one or more client computing devices is determined based on the one or more obtained values for the one or more monitored capacity related factors and one or more adaption rules. The adaption factor may further be determined based on obtained user profile information. The determined adaption factor to adapt operation of the one or more provided services at the at least one of the one or more client computing devices is provided.

This technology provides a number of advantages including providing methods and devices for dynamically adapting provided application services on a client computing device based on current server usage and obtained user profile information. With this technology, capacity related factors of incoming traffic to servers is monitored and used to optimize handling of requests from and services provided at client computing devices. By adapting to the load of servers with this technology, the inbound traffic to servers can be controlled in manner which enables client computing devices to be accommodated more efficiently and effectively.

DETAILED DESCRIPTION

Figure 1:
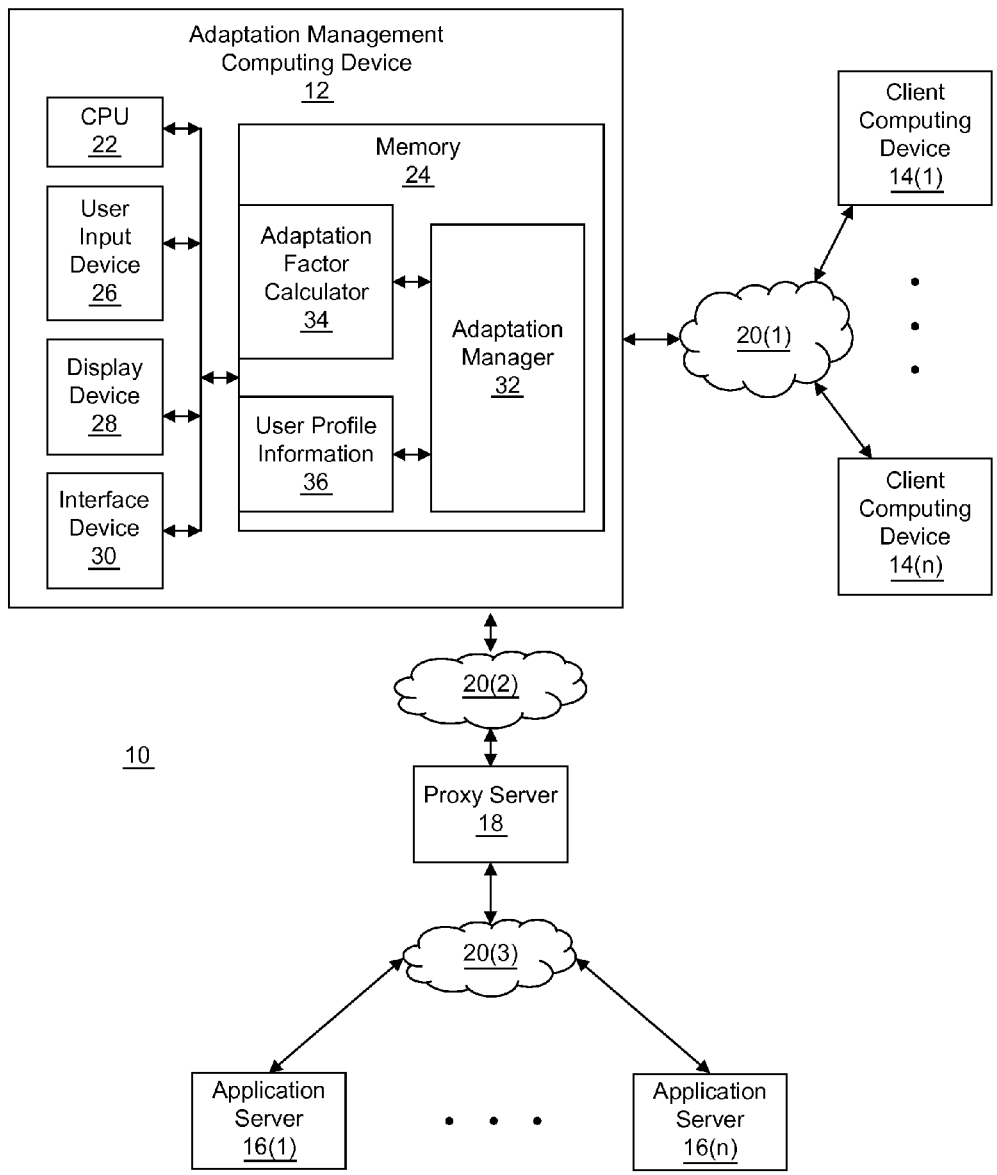
FIG. 1 is an environment with an exemplary adaption management computing device.

An environment 10 with an exemplary adaption management computing device 12 is illustrated in FIG. 1. The environment 10 includes the adaption management computing device 12, client computing devices 14(1)-14(n), application server 16(1)-16(n), and an optional proxy server 18 which are all coupled together by one or more communication networks 20(1)-20(3), although this environment can include other types and numbers of systems, devices, components, and elements in other configurations, such as multiple numbers of each of these apparatuses and devices. This technology provides a number of advantages including providing methods and devices that dynamically adapt provided services on a client computing device to current server usage and obtained user profile information.

The adaption management computing device 12 includes a central processing unit (CPU) or processor 22, a memory 24, a user input device 26, a display 28, and an interface device 30 which are coupled together by a bus or other link, although other numbers and types of systems, devices, components, and elements in other configurations and locations can be used. The processor 22 executes a program of stored instructions for one or more aspects of the present technology as described and illustrated by way of the examples herein, although other types and numbers of processing devices and logic could be used and the processor could execute other numbers and types of programmed instructions.

The memory 24 stores these programmed instructions for one or more aspects of the present technology as described and illustrated by way of the examples herein, although some or all of the programmed instructions could be stored and executed elsewhere. A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 22, can be used for the memory 24. In this example, the memory 24 includes an adaption manager module 32, an adaptation factor calculator module 34, and a user profile information database 36 as described and illustrated herein, although other types and numbers of modules with programmed instructions and databases can be used.

By way of example only, the adaption factor calculation module 34 has programmed instructions to consistently monitor one or more capacity related factors, such usage of available processing of the at least one server, usage of available memory of the at least one server, usage of network bandwidth to the at least one server, connectivity to the at least one server, and current time of the day, although other types of and numbers of capacity related factors could be monitored. Additionally, in this example the adaption factor calculation module 34 has programmed instructions to obtain one or more stored adaption rules from memory 24 and then use the one or more obtained adaption rules along with values for the one or more of the capacity related factors to calculate an adaptation factor. By way of example only, the determined adaptation factor can have a value of zero to ten (0-10) where zero (0) specifies all services should be enabled, ten (10) specifies all services should be disabled, and a value between zero (0) and ten (1) specifies one or more of the services should be enabled, limited, and/or disabled at one of the client computing device 14(1)-14(n).

Additionally, by way of example only the user profile information database 36 contains profile information about the user logged in at each of the client computing devices 14(1)-14(n), such as whether the user has subscribed to be a premium user or has not subscribed and is a non-premium user. Although subscription information is listed in this example, other types and amounts of user profile information could be stored and used to determine an adaption factor.

Further, by way of example only the adaption manager module 32 has programmed instructions to determine an adaption factor based on the initial adaptation factor calculated from the adaption factor calculator module 34 and the user profile information obtained from user profile information database 36, such as which users have subscribed for premium access and which have not subscribed. Although in this example an adaption factor is determined from an initial adaptation factor and the obtained user profile information, other manners for determining the adaption factor to apply to one of the client computing devices 14(1)-14(n) can be used.

The user input device 26 in the adaption management computing device 12 is used to input data and/or selections, although the user input device could be used to input other types of requests and data and interact with other elements. The user input device 26 can include keypads, touch screens, and/or vocal input processing systems although other types and numbers of user input devices can be used. The display 28 in the adaption management computing device 12 is a computer monitor, although other types and numbers of displays could be used.

The interface device 30 in the adaption management computing device 12 is used to operatively couple and communicate between the adaption management computing device 12, client computing devices 14(1)-14(n), application servers 16(1)-16(n), optional proxy server 18, via one or more of the communications networks 20(1)-20(3), although other types and numbers of communication networks or systems with other types and numbers of connections and configurations can be used. By way of example only, the communications network could use TCP/IP over Ethernet and industry-standard protocols, including NFS, CIFS, SOAP, XML, LDAP, and SNMP, although other types and numbers of communication networks, such as a direct connection, a local area network, a wide area network, a personal area network, such as Bluetooth, modems and phone lines, e-mail, and wireless communication technology, each having their own communications protocols, can be used.

Each of the client computing devices 14(1)-14(n) includes a central processing unit (CPU) or processor, a memory, a user input device, a display device, and an interface or I/O system, which are coupled together by a bus or other link, although the client computing devices could comprise other numbers and types of devices, elements, and components in other configurations.

The processor in each of the client computing devices 14(1)-14(n) executes a program of stored instructions for one or more other aspects of the present technology as described and illustrated by way of the examples herein, although other types and numbers of processing devices and logic could be used and the processor could execute other numbers and types of programmed instructions.

The memory in each of the client computing devices 14(1)-14(n) stores these programmed instructions for one or more aspects of the present technology as described and illustrated by way of the examples herein, although some or all of the programmed instructions could be stored and executed elsewhere. A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor in each of the client computing devices 14(1)-14(n), can be used for the memory in each of the client computing devices 14(1)-14(n). In this example, the memory in each of the client computing devices 14(1)-14(n) includes a client adaption configuration module with programmed instructions on enabling, restricting and/or disabling application services based on adaptation factor, although other types and numbers of modules with programmed instructions and databases can be used. By way of example only, the client computing devices 14(1)-14(n) could comprise a laptop computing systems, desktop computing systems, tablets, smart phones, and PDAs, although other types of devices could be used.

The application servers 16(1)-16(n) and the optional proxy server 18 each include a central processing unit (CPU) or processor, a memory, and an interface or I/O system, which are coupled together by a bus or other link, although each of the application servers and proxy server could comprise other types and numbers of devices, elements, and components in other configurations with other functions.

Although examples of the adaption management computing device 12, the client computing devices 14(1)-14(n), application servers 16(1)-16(n), and optional proxy server 18 coupled together via one or more communication networks 20(1)-20(3) are illustrated and described herein, each of these systems can be implemented on any suitable computer system or computing device. It is to be understood that the devices and systems of the examples described herein are for exemplary purposes, as many variations of the specific hardware and software used to implement the examples are possible, as will be appreciated by those skilled in the relevant art(s).

Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those ordinary skill in the art.

In addition, two or more computing systems or devices can be substituted for any one of the systems in any embodiment of the examples. Accordingly, principles and advantages of distributed processing, such as redundancy and replication also can be implemented, as desired, to increase the robustness and performance of the devices and systems of the examples. The examples may also be implemented on computer device or devices that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the present technology as described and illustrated by way of the examples herein, as described herein, which when executed by a processor, cause the processor to carry out the steps necessary to implement the methods of the examples, as described and illustrated herein.

Figure 2:
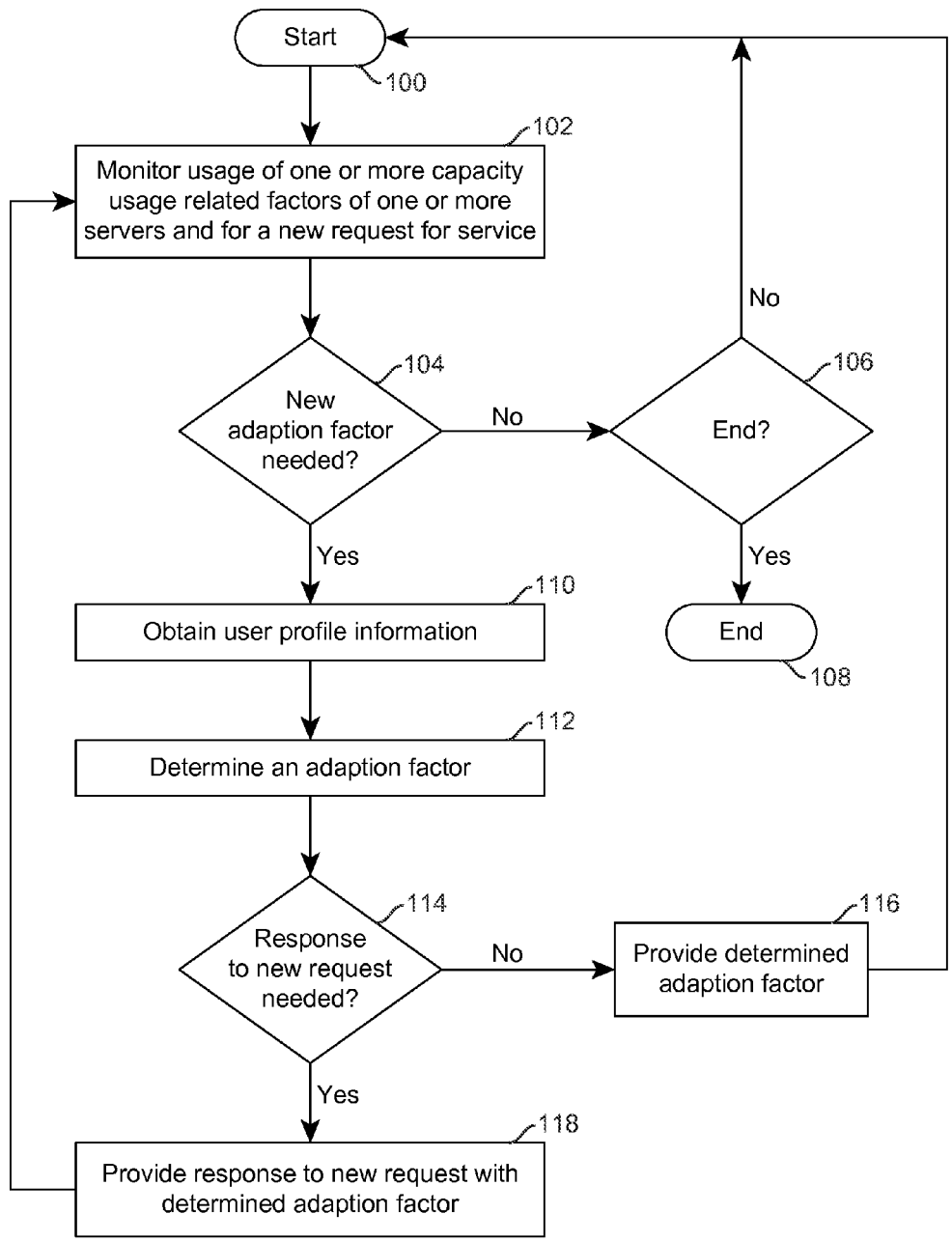
FIG. 2 is a flow chart of an exemplary method for dynamically determining an adaption factor.

An exemplary method for determining an adaption factor is now described with reference to FIGS. 1-2. In step 100 this method starts. In step 102 the adaption management computing device 12 monitors one or more capacity related factors of one or more servers 16(1)-16(n) which are providing one or more services to client computing devices 14(1)-14(n), although other manners for monitoring other types and numbers of usage metrics. In this example, the adaption management computing device 12 consistently monitors the usage of available processing capability of application servers 16(1)-16(n), available memory capacity of application servers 16(1)-16(n), available network bandwidth to application servers 16(1)-16(n), connectivity to one or more of the application servers 16(1)-16(n), the time of the day, and past usage history data, such as when and what types of application services are requested by way of example only, although other types and numbers of factors could be monitored.

In step 104, the adaption management computing device 12 determines whether a new adaption factor for one of the client computing devices 14(1)-14(n) is needed based on the monitored usage of the one or more capacity related factors and/or based on a new application request for service, although other types and numbers of factors or actions could initiate determining a new adaption factor. If in step 104, the adaptation management computing device 12 determines a new adaption factor for one of the client computing devices 14(1)-14(n) is not needed, then the No branch is taken to step 106.

In step 106, the adaption management computing device 12 determines whether this method should end. If in step 106 the adaption management computing device 12 determines this method should end, then the Yes branch is taken to step 108 where this exemplary process can end. If in step 106 the adaption management computing device 12 determines this method should not end, then the No branch is taken back to step 100 as described earlier.

If back in step 104, the adaptation management computing device 12 determines a new adaption factor for one of the client computing devices 14(1)-14(n) is needed, then the Yes branch is taken to step 110. In step 110, the adaptation management computing device 12 obtains user profile information for one or more of the current users logged into the client computing devices 14(1)-14(n) and accessing servers 16(1)-16(n), although the user profile information can be obtained from other sources in other manners. By way of example only, user profile information could indicated whether one or more of the current users logged into the client computing devices 14(1)-14(n) have subscribed for premium access or have not subscribed for premium access, although other types and amounts of user profile information can be obtained.

In step 112, the adaption manager module 32 in the adaption management computing device 12 determines an adaption factor for one or more of the client computing devices 14(1)-14(n) using the adaption factor calculator module 34 and based on the one or more monitored usage of the one or more capacity related factors, the obtained user profile information from user profile information database 36, and one or more stored adaption rules obtained from memory 24, although other manners for determining the adaption factor can be used. A variety of different types and numbers of adaption rules alone or in combination can be utilized.

By way of example only, if utilization of available processing of servers 16(1)-16(n) is above a processing utilization threshold, then the programmed adaption rule may be configured to limit and/or disable one or more services of client computing devices 14(1)-14(n) and if below a processing utilization threshold may be configured to increase or enable one or more services of client computing devices 14(1)-14(n). In another example if utilization of available memory of servers 16(1)-16(n) is above a memory utilization threshold, then the programmed adaption rule may be configured to limit and/or disable one or more services of client computing devices 14(1)-14(n) and if below a memory utilization threshold may be configured to increase or enable one or more services of client computing devices 14(1)-14(n). In yet another example if utilization of available network bandwidth of servers 16(1)-16(n) is above an available network bandwidth utilization threshold, then the programmed adaption rule may be configured to limit and/or disable one or more services of client computing devices 14(1)-14(n) and if below an available network bandwidth utilization threshold may be configured to increase or enable one or more services of client computing devices 14(1)-14(n). In yet another example if connectivity to one or more of servers 16(1)-16(n) decreases, then the programmed adaption rule may be configured to limit and/or disable one or more services of client computing devices 14(1)-14(n) and if connectivity increases, such as from an 3G service to 4G service, may be configured to increase or enable one or more services of client computing devices 14(1)-14(n). In yet another example if the current time falls outside a set range of time, such as normal business hours for a bank, then the programmed adaption rule may be configured to limit and/or disable one or more services of client computing devices 14(1)-14(n) and if current time falls within a set range of time then the programmed adaption rule may be configured may be configured to increase or enable one or more services of client computing devices 14(1)-14(n). In yet another example, if past usage history data indicates an expected increase in available capacity of servers 16(1)-16(n) to handle requests based on a prior pattern of decreased requests for an upcoming time period, then the programmed adaption rule may be configured to increase or enable one or more services of client computing devices 14(1)-14(n). If the past usage history data indicates an expected decrease in available capacity of servers 16(1)-16(n) to handle requests based on a prior pattern of increased requests for an upcoming time period, then the programmed adaption rule may be configured to limit or disable one or more services of client computing devices 14(1)-14(n).

In step 114, the adaption management computing device 12 determines whether one of the client computing devices 14(1)-14(n) has a new application request for a service which requires a response. If in step 114, the adaption management computing device 12 determines none of the client computing devices 14(1)-14(n) has made a new application request which requires a response, then the No branch is taken to step 116. In step 116, the adaption management computing device 12 provides the one or more determined adaption factors to the corresponding one or more of the client computing devices 14(1)-14(n). Each of the provided adaption factors is configured to modify operation of one or more of the application services at one or more of the client computing devices 14(1)-14(n), such as enabling, limiting, and/or disabling one or more application services.

If back in step 114, the adaption management computing device 12 determines one of the client computing devices 14(1)-14(n) has made a new application request which requires a response, then the Yes branch is taken to step 118. In step 118, the adaption management computing device 12 provides the response obtained to the new request from one of the servers 16(1)-16(n) along with the determined adaption factor to the corresponding one of the client computing devices 14(1)-14(n). Again the provided adaption factor is configured to modify operation of one or more of the application services at the requesting one of the client computing devices 14(1)-14(n), such as enabling, limiting, and/or disabling one or more application services.

Figure 3:
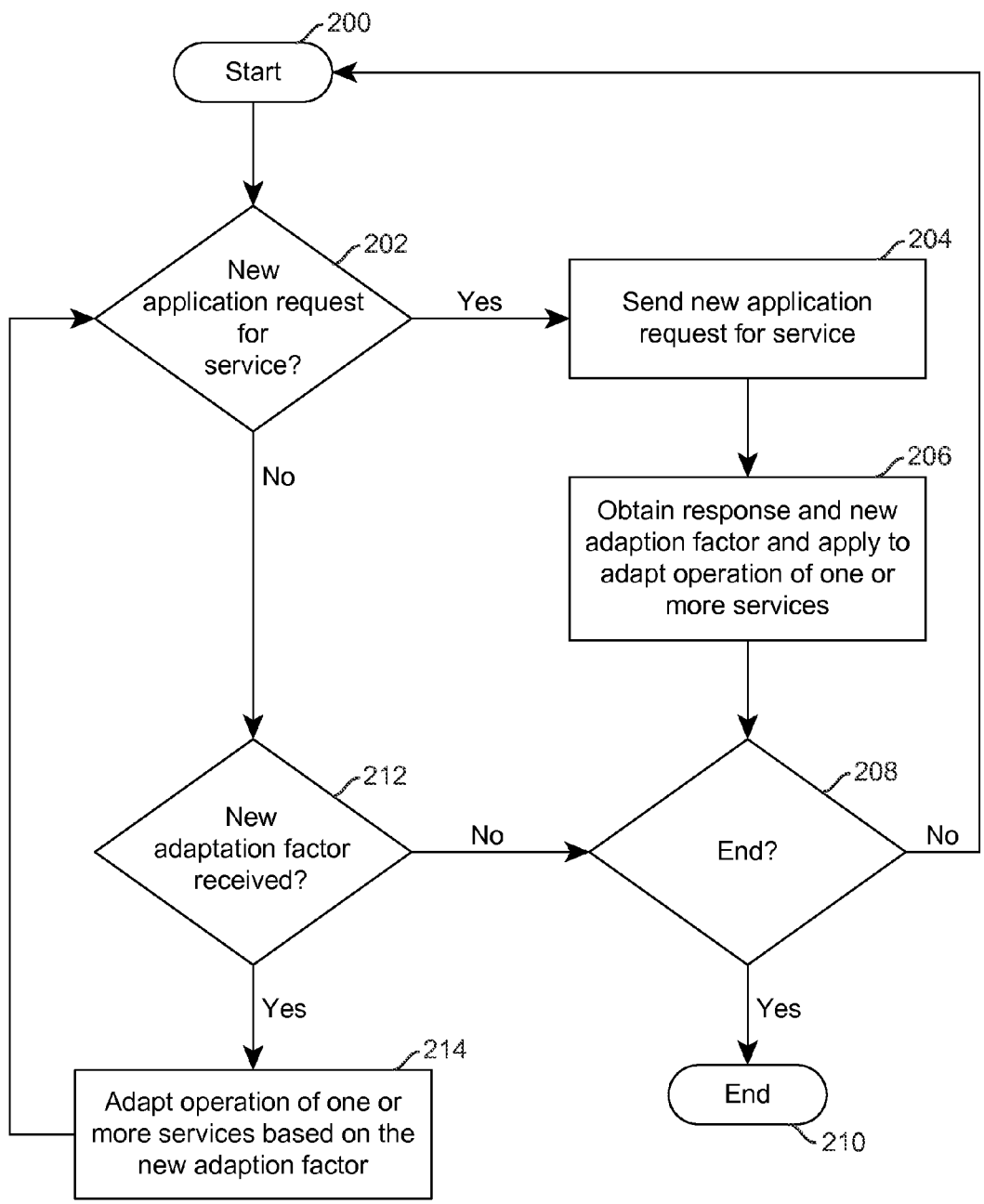
FIG. 3 is a flow chart of an exemplary method for dynamically obtaining and implementing a determined adaption factor.

An exemplary method for dynamically obtaining and implementing a determined adaption factor is now described with reference to FIGS. 1 and 3. In step 200 this method starts. In step 202 one of the client computing devices 14(1)-14(n) determines whether a new application request for a service needs to be submitted. If in step 202, the adaption management computing device 12 determines a new application request for a service needs to be submitted, then the Yes branch is taken to step 204.

In step 204, the requesting one of the client computing devices 14(1)-14(n) submits the request to the appropriate one of the servers 16(1)-16(n) via the adaption management computing device 12 and proxy server 18, although the request could be transmitted in other manners. In step 206, the requesting one of the client computing devices 14(1)-14(n) obtains a response from the appropriate one of the servers 16(1)-16(n) along with a new adaption factor from adaption management computing device 12 which can be determined as described with the example shown in FIG. 2. The requesting one of the client computing devices 14(1)-14(n) applies the new adaption factor to modify operation of one or more provide application services based on the determined adaption factor, such as enabling, limiting, or disabling one or more of the provided application services.

In step 208, the requesting one of the client computing devices 14(1)-14(n) determines whether this method should end. If in step 208 the requesting one of the client computing devices 14(1)-14(n) determines this method should end, then the Yes branch is taken to step 210 where this exemplary process can end. If in step 208 the requesting one of the client computing devices 14(1)-14(n) determines this method should not end, then the No branch is taken back to step 200 as described earlier.

If back in step 202, none of the client computing devices 14(1)-14(n) has made a new application request for a service, then the No branch is taken to step 212. In step 212, the client computing devices 16(1)-16(n) determine whether any have received a new adaption factor from adaption management computing device 12. If in step 212, none of the client computing devices 16(1)-16(n) have received a new adaption factor from adaption management computing device 12, then the No branch is taken to step 208 as described earlier.

If back in step 212, one or more of the client computing devices 16(1)-16(n) have received a new adaption factor from adaption management computing device 12, then the Yes branch is taken to step 214. In step 214, the one or more of the client computing devices 14(1)-14(n) which received the new adaption factor, apply the new adaption factor to modify operation of one or more provide application services based on the determined adaption factor, such as enabling, limiting, or disabling one or more of the provided application services.

Accordingly, as illustrated and described with the example herein this technology provides methods and devices for dynamically adapting provided application services on a client computing device based on current server usage and obtained user profile information. With this technology, capacity related factors of incoming traffic to servers is monitored and used to optimize handling of requests from and services provided at client computing devices. By adapting to the load of servers with this technology, the inbound traffic to servers can be controlled in manner which enables client computing devices to be accommodated more efficiently and effectively.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for determining an adaption factor, the method comprising:

monitoring by an adaption management computing device one or more capacity related factors of one or more servers providing one or more services to one or more client computing devices to obtain one or more values, wherein at least one of the monitored one or more capacity related factors of the one or more servers comprises usage of available memory of the one or more servers;

determining by the adaption management computing device an adaption factor for at least one of the one or more client computing devices based on the one or more obtained values for the one or more monitored capacity related factors and one or more adaption rules;

providing by the adaption management computing device the determined adaption factor to adapt ongoing operation of the one or more provided services at the at least one of the one or more client computing devices, wherein the adapted ongoing operation comprises limiting at least one of the one or more provided services at the at least one of the one or more client computing devices;

determining, by the adaption management computing device, an expected increase in a handling capacity of the one or more servers; and providing, by the adaption management computing device, a new adaption factor to adapt ongoing operation of the limiting at least one of the one or more provided services at the at least one of the one or more client computing devices, wherein the provided new adaption factor comprises enabling the limiting at least one of the one or more provided services based on the determined expected increase in the handling capacity of the one or more servers and when a current time falls outside a designated time range.

2. The method as set forth in claim 1 further comprising obtaining by the adaption management computing device user profile information associated with the at least one of the one or more client computing devices, wherein the determining is further based on the obtained user profile information.

3. The method as set forth in claim 1 further comprising:
obtaining by the adaption management computing device an application service request from one of the client computing devices for another service from the one or more servers; and
initiating the adaption management computing device the determining based on the obtaining the application service request from one of the client computing devices for another service.

4. The method as set forth in claim 1 wherein the monitoring further comprises interacting by the adaption management computing device with at least one proxy server which is monitoring the one or more capacity related factors of the one or more servers to obtain the one or more values.

5. The method as set forth in claim 1 wherein the one or more capacity related factors comprise usage of available processing of the one or more servers, usage of available network bandwidth to the one or more servers, connectivity to the one or more servers, current time of the day, or an identified pattern of use from past usage history data.

6. The method as set forth in claim 5 wherein at least one of the one or more adaption rules is configured to adjust the adaption factor to adapt operation of the one or more provided services at the at least one of the one or more client computing devices when: the usage of available processing of the one or more servers exceeds a processing threshold; the usage of available memory of the one or more servers exceeds a memory threshold; the usage of available network bandwidth to the one or more servers exceeds a network bandwidth threshold; the connectivity to the one or more servers indicates a change in connectivity to at least one of the one or more servers; or the past usage history data identifies an expected change in upcoming capacity within a first period of time.

7. The method as set forth in claim 1 wherein the providing further comprises providing the determined application factor configured to enable, or disable at least one of the one or more provided services at the at least one of the one or more client computing devices.

8. A non-transitory computer readable medium having stored thereon instructions for determining an adaption factor comprising machine executable code which when executed by at least one processor, causes the processor to perform steps comprising:
monitoring one or more capacity related factors of one or more servers providing one or more services to one or more client computing devices to obtain one or more values, wherein at least one of the monitored one or more capacity related factors of the one or more servers comprises usage of available memory of the one or more servers;
determining an adaption factor for at least one of the one or more client computing devices based on the one or more obtained values for the one or more monitored capacity related factors and one or more adaption rules; and providing the determined adaption factor to the at least one of the one or more client computing devices configured to adapt ongoing operation of the one or more provided services at the at least one of the one or more client computing devices, wherein the adapted ongoing operation comprises limiting at least one of the one or more provided services at the at least one of the one or more client computing devices;

determining an expected increase in a handling capacity of the one or more servers; and providing a new adaption factor to adapt ongoing operation of the limiting at least one of the one or more provided services at the at least one of the one or more client computing devices, wherein the provided new adaption factor comprises enabling the limiting at least one of the one or more provided services based on the determined expected increase in the handling capacity of the one or more servers and when a current time falls outside a designated time range.

9. The medium as set forth in claim 8 further comprising obtaining user profile information associated with the at least one of the one or more client computing devices, wherein the determining is further based on the obtained user profile information.

10. The medium as set forth in claim 8 further comprising:
obtaining an application service request from one of the client computing devices for another service from the one or more servers; and
initiating the determining based on the obtaining the application service request from one of the client computing devices for another service.

11. The medium as set forth in claim 8 wherein the monitoring further comprises interacting with at least one proxy server which is monitoring the one or more capacity related factors of the one or more servers to obtain the one or more values.

12. The medium as set forth in claim 8 wherein the one or more capacity related factors comprise usage of available processing of the one or more servers, usage of available network bandwidth to the one or more servers, connectivity to the one or more servers, current time of the day, or an identified pattern of use from past usage history data.

13. The medium as set forth in claim 12 wherein at least one of the one or more adaption rules is configured to adjust the adaption factor to adapt operation of the one or more provided services at the at least one of the one or more client computing devices when: the usage of available processing of the one or more servers exceeds a processing threshold; the usage of available memory of the one or more servers exceeds a memory threshold; the usage of available network bandwidth to the one or more servers exceeds a network bandwidth threshold; the connectivity to the one or more servers indicates a change in connectivity to at least one of the one or more servers; or the past usage history data identifies an expected change in upcoming capacity within a first period of time.

14. The medium as set forth in claim 8 wherein the provided determined adaption factor configured to adapt operation of the one or more provided services further comprises providing the determined application factor configured to enable, or disable at least one of the one or more provided services at the at least one of the one or more client computing devices.

15. An adaptation management computing device comprising:
one or more processors;
a memory coupled to the one or more processors which are configured to execute programmed instructions stored in the memory comprising:
monitoring one or more capacity related factors of one or more servers providing one or more services to one or more client computing devices to obtain one or more values, wherein at least one of the monitored one or more capacity related factors of the one or more servers comprises usage of available memory of the one or more servers;
determining an adaption factor for at least one of the one or more client computing devices based on the one or more obtained values for the one or more monitored capacity related factors and one or more adaption rules; and
providing the determined adaption factor to the at least one of the one or more client computing devices configured to adapt ongoing operation of the one or more provided services at the at least one of the one or more client computing devices, wherein the adapted ongoing operation comprises limiting at least one of the one or more provided services at the at least one of the one or more client computing devices;
determining an expected increase in a handling capacity of the one or more servers; and
providing a new adaption factor to adapt ongoing operation of the limiting at least one of the one or more provided services at the at least one of the one or more client computing devices, wherein the provided new adaption factor comprises enabling the limiting at least one of the one or more provided services based on the determined expected increase in the handling capacity of the one or more servers and when a current time falls outside a designated time range.

16. The device as set forth in claim 15 wherein the one or more processors is further configured to execute programmed instructions stored in the memory further comprising obtaining user profile information associated with the at least one of the one or more client computing devices, wherein the determining is further based on the obtained user profile information.

17. The device as set forth in claim 15 wherein the one or more processors is further configured to execute programmed instructions stored in the memory further comprising:
obtaining an application service request from one of the client computing devices for another service from the one or more servers; and
initiating the determining based on the obtaining the application service request from one of the client computing devices for another service.

18. The device as set forth in claim 15 wherein the one or more processors is further configured to execute programmed instructions stored in the memory for the monitoring further comprises interacting with at least one proxy server which is monitoring the one or more capacity related factors of the one or more servers to obtain the one or more values.

19. The device as set forth in claim 15 wherein the one or more capacity related factors comprise usage of available processing of the one or more servers, usage of available network bandwidth to the one or more servers, connectivity to the one or more servers, current time of the day, or an identified pattern of use from past usage history data.

20. The device as set forth in claim 19 wherein at least one of the one or more adaption rules is configured to adjust the adaption factor to adapt operation of the one or more provided services at the at least one of the one or more client computing devices when: the usage of available processing of the one or more servers exceeds a processing threshold; the usage of available memory of the one or more servers exceeds a memory threshold; the usage of available network bandwidth to the one or more servers exceeds a network bandwidth threshold; the connectivity to the one or more servers indicates a change in connectivity to at least one of the one or more servers; or the past usage history data identifies an expected change in upcoming capacity within a first period of time.

21. The device as set forth in claim 15 wherein the provided determined adaption factor configured to adapt operation of the one or more provided services further comprises providing the determined application factor configured to enable, or disable at least one of the one or more provided services at the at least one of the one or more client computing devices.

* * * * *